March 20, 1962 H. DE S. LAUVE 3,026,147
TIRE TRIM WITH MARGINAL TENSION RELIEF
Filed Feb. 23, 1960
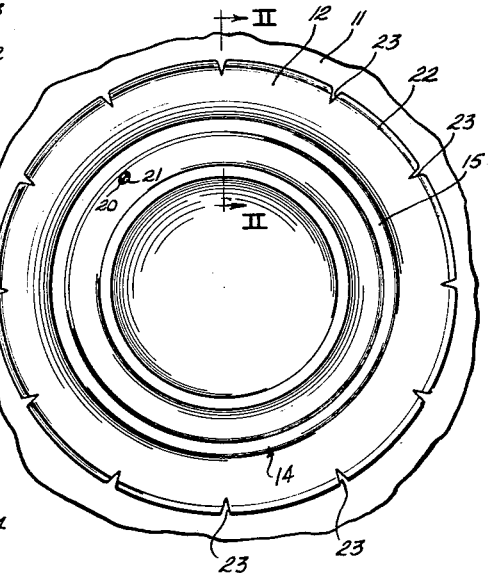
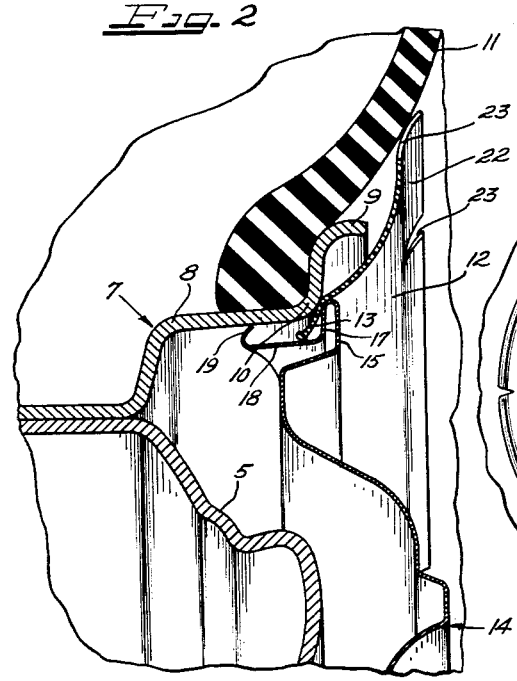
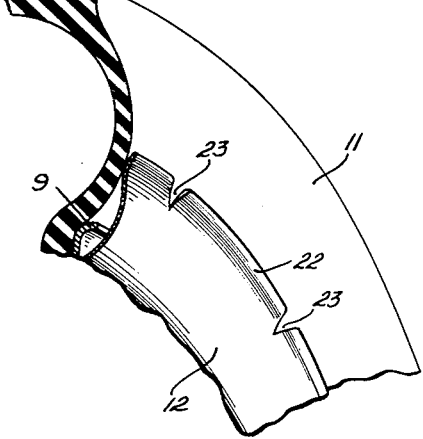
Inventor
HENRY DE S. LAUVE
by
Attys.

3,026,147
TIRE TRIM WITH MARGINAL TENSION RELIEF
Henry deS. Lauve, Grosse Pointe, Mich., assignor to Lyon Incorporated, Detroit, Mich., a corporation of Delaware
Filed Feb. 23, 1960, Ser. No. 10,156
1 Claim. (Cl. 301—37)

The present invention relates to the ornamental and protective covering of the outer sides of vehicle wheels and more particularly concerns the provision of novel tire side wall simulating cover means.

Tires with white side walls comprising a lamina of white colored rubber on the normally black or gray side wall are popular because of the attractive appearance added to the generally attractive ornamental appearance of the associated vehicle and of the covers on the wheels. However, in order to provide tires with integral white side walls a compromise in curing is necessary since the white rubber demands a modification in curing procedures as to temperature, especially, in comparison to the black rubber. Therefore, the tires with white side wall cured directly thereon are generally less wear resistant and more particularly will not withstand as high operating temperatures as all black side wall tires which have been subjected to the proper cure for the black rubber. In other words, longer life can be expected in all black, properly cured tires than can be expected from white side wall tires.

Moreover, the white side walls of the tires are notoriously subject to soiling and scuffing and thus deterioration in appearance. One reason for this is that the rubber material from which they are made is relatively soft and porous.

It has been proposed to provide tire side wall simulating ring members which are held onto the wheel by means securing an inner marginal portion of the ring member to the tire rim while the ring member projects beyond the tire rim and into engagement at its outer margin with the tire side wall. One of the problems encountered in this type of assembly resides in that since the tire side wall necessarily elastically flexes in running at the local area of vehicle dead load imposition, there is necessarily a corresponding axial flexure of the ring member at the margin thereof which engages the tire side wall and this imposes a strain upon the margin of the ring member. Furthermore, curbing or like torsional forces against the ring member may tend to distort the margin, sometimes permanently so that there is a consequent buckle on the margin and imperfect contact with the tire side wall.

It is accordingly an important object of the present invention to afford for vehicle wheels the advantages of white or other colored side wall appearance, taking advantage of the use of a separately formed and applied ring member and which ring member is provided with an improved tire side wall engaging marginal structure.

Another object of the invention is to provide a new and improved form-sustaining tire side wall simulating ring construction which is advantageously constructed to resist deformation warpage at its outer margin.

A further object of the invention is to provide an improved tire side wall simulating ring structure having an improved outer marginal tire side wall engaging structure which is locally conformable with the tire side wall in all of its flexings independently of adjacent portions of the ring margin in a generally self-compensating manner.

Yet another object of the invention is to provide an improved thin section tire side wall simulated ring construction.

Other objects, features and advantages of the present invention will be readily apparent from the following detailed description of a preferred embodiment thereof taken in conjunction with the accompanying drawing, in which:

FIGURE 1 is an outer side elevational view of a wheel structure embodying features of the invention;

FIGURE 2 is an enlarged fragmentary radial sectional detail view taken substantially on the line II—II of FIGURE 1; and FIGURE 3 is a fragmentary outer side perspective view showing the ring and tire assembly.

Referring to FIGURE 2, a disk spider wheel body 5 is peripherally attached to and supports a multi-flange, drop center tire rim 7 having an intermediate generally axially outwardly extending and radially inwardly facing flange 8 leading into a terminal flange 9 to which it is joined on a shoulder juncture 10. Supported by the tire rim is a pneumatic tire 11 which has an outer side wall projecting axially and radially outwardly beyond the tip of the terminal flange 9 of the tire rim.

Disposed in ornamental and protective relation over the outer side of the tire 11 adjacently beyond the terminal flange 9 is a tire side wall simulating ring member 12. While the trim ring member 12 may be colored white, it may be of any other preferred color. Moreover, the ring member 12 may be made from various materials although especially satisfactory results are obtainable where it comprises a thin sheet-like non-metallic material such as a synthetic plastic possessed of resilient flexibility, durability, satisfactory color characteristics and smooth close-grained and substantially non-porous surface finish. Improved synthetic plastics are now available, and a high density polyethylene plastic is a preferred material since it is stiffer and harder than some other types of similar materials and possessed of considerable resiliency. Such material lends itself readily to molding into the preferred shape and contours which will render the ornamental ring member 12 most efficient.

In the present instance, the ring member 12 is of a diameter to overlie the tire rim terminal flange 9 at its inner portion and is provided with an inner marginal seating flange 13 which is engageable with the tire rim shoulder 10. A suitable metallic retaining member is provided for clamping the inner ring margin 13 against the tire rim shoulder and in this instance comprises a wheel cover 14 having an annular outer margin 15 of a diameter to overlie the tire rim and more especially the tire rim shoulder 10 and provided with an underturned flange 17 which clampingly engages the ring margin 13 and has extending axially inwardly therefrom a portion having axially inward retaining finger extensions 18 equipped with retaining terminals 19 that engage retainingly in press-on, pry-off relation with the tire rim intermediate flange 8. A valve stem aperture 20 in the wheel cover accommodates a valve stem 21 therethrough.

From the inner seating margin 13, the ring member 12 extends radially and axially outwardly in axially outwardly radially arched cross-section to an outer margin 22 which is preferably turned to provide an axially inwardly concave-convex form to afford smooth abrasion-free contact against the tire side wall. The normal relationship of the outer margin 22 to the inner marginal flange 13 is in a diametrical plane more closely related to a diametrical plane through the inner marginal flange 13 than depicted in FIGURE 2 so that in the assembly, the outer marginal portion 22 engages under resilient tension against the tire side wall since the inner margin 13 is deflected axially inwardly and clamped against the tire rim shoulder 10.

In order to relieve the outer margin 22 from undue circumferential strains which might under severe conditions tend to buckle the margin, a circumferential series of generally radial slots 23 are provided through the margin 22, such slots being in the present instance of generally V-notch form although they may comprise simply slits or any other shaped slot or notch depending upon particular preferences as to form or appearance. Thereby, the margin 22 is uniformly subdivided into a circumferential series of independently resiliently flexible finger-like sections. These sections are at least to a limited extent axially flexible relative to the adjacent marginal sections from which divided by the slots 23 within the usual range of elastic local bulging of the tire side wall against which the respective sections bear. Moreover, even though the tire side wall may bulge excessively as where it goes soft or even flat there is sufficient relief from excessive tensions and strains on the outer margin of the ring member to avoid buckling.

It may also be noted that by having the notch-like slots 23 extend radially inwardly beyond the immediate tire side wall contacting areas of the sections of the margin of the ring member, limited peripheral radially opening passages from the chamber behind the ring member are provided at the inner ends of the notches, through which water or dirt that may work in behind the ring member can drain and be ejected centrifugally.

In applying the ring member 12 to the outer side of the wheel, it is first assembled in the present instance with the wheel cover 14 by engaging the inner marginal structure of the ring member with the retaining outer marginal structure of the cover and then applying the cover and ring member assembly to the outer side of the wheel by centering the cover with respect to the wheel and registering the valve stem opening 20 with the valve stem 21 and then pressing the cover home onto the wheel until the retaining fingers 18 have made full retaining engagement with the intermediate flange 8 of the tire rim and the underturned margin of the cover has clamped the seating flange 13 of the ring member against the rim shoulder 10. As previously described, in this relationship, the outer margin 22 of the ring member 12 is in tensioned retaining engagement with the side wall of the tire 11. Removal of the ring member is adapted to be effected by locally flexing the same away from the tire side wall and inserting a pry-off tool therebehind and behind the inner seating marginal flange 13 thereof and applying pry-off leverage to the margin of the cover to dislodge the retaining fingers 18 from the tire rim.

It will be understood that modifications and variations may be effected without departing from the scope of the novel concepts of the present invention.

I claim as my invention:

In a wheel structure including a tire rim having an intermediate flange and a terminal flange and supporting a pneumatic tire with a side wall extending radially outwardly beyond the terminal flange and bulging axially outwardly beyond the terminal flange, said intermediate and terminal flanges joining on a juncture shoulder facing generally radially inwardly and axially outwardly, a circular metallic cover member having a portion thereof directed toward said shoulder and retaining flange structure extending from said portion and engageable with said intermediate flange and thereby maintaining said portion in thrusting relation toward said shoulder, a circular thin sheet-like resiliently flexible trim member having an inner marginal portion clamped against said shoulder by said cover member portion and a circular body portion extending generally radially and axially outwardly arched over the terminal flange in spaced relation thereto and having an outer marginal portion directed toward said tire side wall, said outer marginal portion having a circumferentially spaced series of radially outwardly opening notches therein subdividing the marginal portion into a circumferential series of independently resilient flexible finger-like sections which are axially flexible relative to the body of the ring member, said finger-like sections being of radially convex shape and arching toward the tire side wall so as to have only limited substantially abrasion-free contact with the tire side wall, said slots extending radially inwardly a short distance beyond the contact of said finger-like sections with the tire side wall and providing radially opening passages from the space behind the ring member body, said independently resiliently flexible finger-like sections preventing buckling of the outer marginal portion of the ring member by affording relief from excessive tensions and strains such as when the tire side wall bulges excessively.

References Cited in the file of this patent

UNITED STATES PATENTS

| | | |
|---|---|---|
| 2,386,233 | Lyon | Oct. 9, 1945 |

FOREIGN PATENTS

| | | |
|---|---|---|
| 511,056 | Great Britain | Aug. 14, 1939 |
| 1,061,278 | France | Nov. 25, 1953 |